United States Patent
Quoilin

(10) Patent No.: US 10,519,814 B2
(45) Date of Patent: Dec. 31, 2019

(54) CONTROL OF A THERMAL CYCLIC PROCESS

(75) Inventor: Sylvain Quoilin, Liege (BE)

(73) Assignee: ORCAN ENERGY AG, Munich (DE)

( * ) Notice: Subject to any disclaimer, the term of this patent is extended or adjusted under 35 U.S.C. 154(b) by 385 days.

(21) Appl. No.: 13/695,639

(22) PCT Filed: Apr. 20, 2011

(86) PCT No.: PCT/EP2011/002023
§ 371 (c)(1),
(2), (4) Date: Jan. 8, 2018

(87) PCT Pub. No.: WO2011/137980
PCT Pub. Date: Nov. 10, 2011

(65) Prior Publication Data
US 2018/0328232 A1    Nov. 15, 2018

(30) Foreign Application Priority Data
May 7, 2010    (DE) .................. 10 2010 019 718

(51) Int. Cl.
*F01K 13/02*  (2006.01)
*F01K 25/08*  (2006.01)
*G05B 19/4155*  (2006.01)

(52) U.S. Cl.
CPC .............. *F01K 13/02* (2013.01); *F01K 25/08* (2013.01); *G05B 19/4155* (2013.01); *G05B 2219/49204* (2013.01)

(58) Field of Classification Search
CPC ...... F01K 13/02; F01K 25/08; G05B 19/4155
See application file for complete search history.

(56) References Cited

U.S. PATENT DOCUMENTS

| 4,178,762 | A | 12/1979 | Binstock et al. |
| 6,134,891 | A | 10/2000 | Zaviska et al. |
| 8,185,216 | B2 * | 5/2012 | Sekiai ............ F01K 13/02 700/29 |
| 8,590,307 | B2 * | 11/2013 | Kopecek .......... F01K 25/10 60/618 |
| 2003/0070431 | A1 | 4/2003 | Romanelli |

(Continued)

FOREIGN PATENT DOCUMENTS

| JP | 09280503 | 10/1997 |
| JP | 2005504909 | 2/2005 |

(Continued)

*Primary Examiner* — Vincent H Tran
(74) *Attorney, Agent, or Firm* — Moore & Van Allen PLLC; Henry B. Ward, III

(57) ABSTRACT

The invention relates to a method for controlling a thermal cyclic process, in particular an Organic Rankine Cycle (ORC), which is operated with a working medium in conjunction with a dynamic heat source, whereby the method comprises the following steps: (a) determination of a setpoint value of a process variable of the thermal cyclic process from a value of an input parameter or respective values of a plurality of input parameters of the thermal cyclic process; (b) control of the thermal cyclic process with the determined setpoint value of the process variable as a target variable of the control; and (c) repeated execution of steps (a) and (b) when at least one value of the input parameters changes.

12 Claims, 1 Drawing Sheet

(56) References Cited

U.S. PATENT DOCUMENTS

| | | | |
|---|---|---|---|
| 2003/0147351 A1* | 8/2003 | Greenlee | G05B 17/02 370/232 |
| 2003/0213246 A1* | 11/2003 | Coll | F01K 17/02 60/653 |
| 2005/0246039 A1 | 11/2005 | Iino et al. | |
| 2005/0247056 A1* | 11/2005 | Cogswell | F01K 13/02 60/531 |
| 2009/0099667 A1* | 4/2009 | Sekiai | F01K 13/02 700/44 |
| 2009/0211253 A1 | 8/2009 | Radcliff et al. | |
| 2010/0275610 A1 | 11/2010 | Oguchi et al. | |
| 2011/0185734 A1* | 8/2011 | Ramaswamy | F01K 25/10 60/651 |

FOREIGN PATENT DOCUMENTS

| | | |
|---|---|---|
| JP | 2005273655 | 10/2005 |
| JP | 2005284388 | 10/2005 |
| WO | 2009041346 A1 | 4/2009 |
| WO | 2011093850 A1 | 8/2011 |

\* cited by examiner

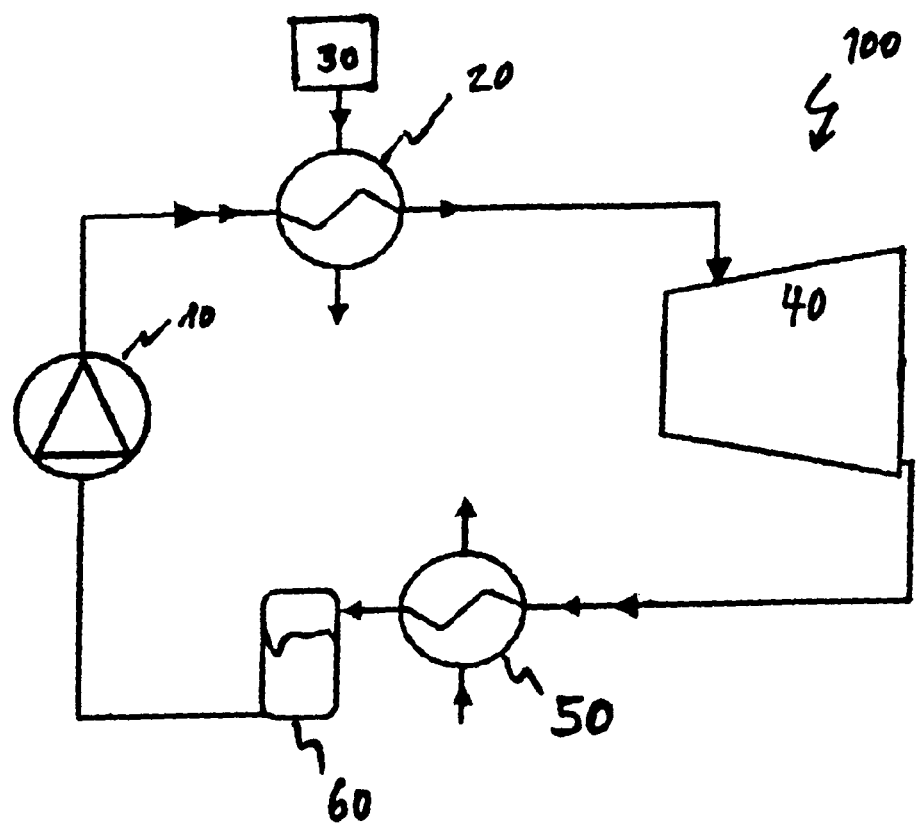

CONTROL OF A THERMAL CYCLIC PROCESS

FIELD OF THE INVENTION

The invention relates to a method and a device for controlling a thermal cyclic process, in particular an ORC system.

BACKGROUND OF THE INVENTION

The Organic Rankine Cycle (ORC) is a method for operating a vapour-power process with a working medium other than water vapour. Used as the working medium are organic fluids with a low vaporisation temperature. The method is used particularly when the available temperature gradient between the heat source and the heat sink is too low for the operation of a turbine driven by water vapour. This is the case, for example, when producing electricity with the help of geothermal energy, in combined heat and power generation, and in the case of solar power plants and ocean thermal energy power plants. The Organic Rankine Cycle closely resembles the Clausius Rankine Cycle that is known from power plant technology and that is the standard cycle in the vapour power process. The organic material used as the working medium in the Organic Rankine Cycle allows a very good adjustment of the cycle to the temperature of the heat source. Depending on the temperature level, different working media are used: hydrocarbons, fluoridated (hydro) carbons (for example, tetrafluoroethane), aromatic hydrocarbons or silicone oils.

A pump brings the fluid working medium to the operating pressure while thereby providing relocation work and expansion or compression work. When the fluid working medium flows through a vaporiser, isothermal energy in the form of heat is fed to the vaporiser. Before the vaporiser, the working medium can be brought to boiling temperature in a pre-heater. After the vaporiser, the vapour of the working medium can be further superheated. Due to thermodynamic reasons, it is, however, possible to eliminate the space-intensive superheating, in which case only slight superheating by a few Kelvin, if any, is selected. The corresponding components pre-heater, vaporiser and superheater can be combined into a single heat-exchange component. In this heat exchanger, the heat that is fed in can be used for both pre-heating and vaporising, as well as for superheating, where applicable.

Used thereby as the heat source for the vaporising process is process heat or waste heat from upstream machines such as, e.g., a combustion engine. Due to the application of energy, the working medium vaporises completely or nearly completely. Saturated vapour forms at the outlet of the vaporiser. The working medium can also exit in a partially vaporised state. The exit as saturated vapour or as slightly superheated vapour is realistic.

The vapour of the working medium flows out of the vaporiser via a pressure pipe and to the ORC expander (for example, a screw expander or turbine) where this working medium is expanded polytropically to a lower pressure, as a result of which work is performed which is converted, e.g., by means of the turbine on its blades, into mechanical energy. In the ideal standard cycle, i.e., without losses and irreversibilities, the expansion would be isentropic. A generator coupled to the expander/turbine converts the mechanical energy into electrical energy. Alternatively to this, the mechanical energy can also be used directly, e.g., it can be (mechanically) coupled to the drive system of a vehicle, or the mechanical energy can be converted into hydraulic energy and fed into a hydraulic system.

Following this, the vapour then flows through a downstream condenser. There the vapour gives off the condensation heat and, where applicable, also sensible heat to a cooling circuit with a cooling media flow by means of desuperheating. The working medium condenses and passes into the liquid state of matter. Due to characteristic thermodynamic characteristics, the working medium usually exits the expansion machine in a superheated state and is consequently first desuperheated and then condensed in the condenser. Depending on the circuitry, a slight supercooling of the working medium can be achieved. The saturated fluid or slightly supercooled working medium can be temporarily stored, e.g., in a storage container. The pump then brings the saturated or (slightly) supercooled working medium from the storage container back to operating pressure, and consequently closes the cycle.

STATE OF THE ART

Before the invention is described, it is necessary to go into the state of the art in the power plant area and in waste heat utilisation.

Control of Power Plants in a Network Before Now

In a power supply network, a balance of generated and demanded energy must always prevail. If the electricity supply is too high or if the demand is too low, the system frequency rises, while the opposite is true if the electricity supply is too low and the demand is too high. The system frequency is used as the reference value in order to create a balance between the generated energy and the demanded energy. In the event of a deviation in the frequency, first the primary control takes effect. By activating the seconds reserve, a stipulated power reserve is implemented automatically in the power plant within 0-30 s. e.g., by removing a throttling of the live vapour in the supply line of the turbine. In the case of the secondary control, the setpoint output values are then raised and the fuel mass flow is adjusted. In the case of thermal power plants, however, these load changes are in the range of >15 minutes because these power plants react very sluggishly. Gas turbine power plants react more swiftly, because here an increase in the fuel mass flow almost instantaneously translates into an output increase (cf. aircraft engine at take-off).

In the case of these power plants, a fixed optimisation of the operating point can be assumed, and continuous optimisation of the operating performance is not necessary because the operating parameters do not fluctuate in broad ranges.

The use of gas turbine waste heat in heat recovery steam generators (combined cycle) represents an analogy to waste heat utilisation by means of ORC. Because recently the fluctuating feed of electrical energy into the power supply system has been increasing, this type of power plant must increasingly take on control tasks and carry out quick load changes.

Here a fixed live vapour temperature is assumed as the setpoint value in order, e.g., to reduce the thermal load on the components resulting from temperature changes.

Control of Heat Recovery Steam Generators Before Now

In investigations regarding the improvement of the control of heat recovery steam generators, a large challenge that has emerged in the operation of forced-flow heat recovery steam generators is the adjustment of a fixed vapour quality at the outlet. Because the mass flow of the flue gas is fixed, the only possibility to adjust the mass flow of the water that is to be vaporised is by means of the rotational speed of the feeding pump. Particularly at start-up, problems arise here due to the inertia of the system. Consequently, e.g., the down time of the system can interfere with the control or also the thermal capacities can have a negative influence on this control. The heat exchanger is often "overfed" in this case, i.e., there is still liquid water present at the end of the vaporiser. For this reason, water separators, so-called start-up vessels, are used.

In addition to design measures for improving the control behaviour, a so-called model-predictive method can be applied as the basis of the process control. Model predictive control (MPC) uses model equations to represent the system that is to be controlled. In MPC, in addition to a consideration of the current state of the system, there is also a calculation of the system's future state, which is then compared to the desired state. In a concrete example, an energy balance of the vaporiser was set up and there was a calculation of which mass flow would have to occur in order to make it possible to achieve a certain vapour quality. For this purpose, in addition to the mass flow and the parameters of the water, the mass flow and the parameters of the heat source have to be taken into consideration, and furthermore feed-in and feed-out effects due to the thermal capacities of the pipe systems have to be taken into account.

In the case of this type of control, the controller no longer has to wait for the change in the reference value and can instead calculate, based on the reference value, which correcting value is necessary in order to achieve a new setpoint value, e.g., another live steam temperature. These investigations do not, however, consider the coordination of the operating parameters with respect to optimisation of the efficiency, and fixed steam parameters that were to be achieved were applied as correcting values. These steam parameters are stipulated, if at all, by a higher-level control, and no dynamic adjustment to a different load that changes in the second or minute range is provided.

Control of ORC Systems Before Now

ORC systems are currently still not used with dynamic waste heat sources. In the case of the use of waste heat from non-dynamic sources, optimal operating parameters for the ORC can be designated one time and then specified as setpoint quantities for the control. This control strategy is similar to the fixed-pressure regulations applied in the power plant sector. The variable-pressure (also called sliding-pressure) control known from power plant technology has, when the vapour is at high temperatures, the advantage that relatively constant vapour temperatures are achieved in the case of a partial load due to the change in the pressure. This contributes to protecting the components against thermally induced tensions, but this is irrelevant for the Organic Rankine Cycle due to the low temperatures in the waste heat utilisation.

If the mentioned fixed-pressure control is implemented without throttling the live steam, e.g., by means of an expansion machine with a variable rotational speed, this leads, in the case of a dynamic heat source (variable temperature and thermal capacity rate) to constant thermal cycle efficiency, but the heat transfer efficiency is not thereby taken into consideration and consequently the system efficiency is not optimal (namely, by up to 10% worse than in the case of the invention presented in the following). The quotient of the generated power of the ORC and the heat output of the heat source relative to a complete cooling of the heat source to the ambient temperature level is called the system efficiency. The system efficiency corresponds to the product of the heat transfer efficiency and the thermal cycle efficiency.

BRIEF SUMMARY OF THE INVENTION

In view of the disadvantages of the state of the art, the invention is based on the problem of providing control of a thermal cyclic process, particularly of an ORC, with which it is possible to adjust (preferably at any point in time) operation optimised with respect to the system efficiency.

The cited problem is solved by the method according to Claim 1, the device according to Claim 11 and the computer program product according to Claim 12. Advantageous further developments are defined in the dependent claims.

The inventive method for controlling a thermal cyclic process, in particular an Organic Rankine Cycle (ORC), which is operated with a working medium and in conjunction with a dynamic heat source, comprises the following steps: (a) determination of a setpont value of a process variable of the thermal cyclic process from a value of an input parameter or respective values of a plurality of input parameters of the thermal cyclic process; (b) control of the thermal cyclic process with the determined setpoint value of the process variable as a target variable of the control; and (c) repeated execution of the steps (a) and (b) when at least one value of the input parameters changes.

Understood as a dynamic waste heat source is a heat source whose heat output fluctuates due to a change in the mass flow holding the heat and/or in the temperature and/or in the thermal capacity. The thermal cyclic process thereby draws energy from the dynamic heat source, i.e., the heat quantity fed to the cyclic process per time interval can be changeable, meaning it can vary in time.

A setpoint value of a process variable is determined in dependence on the measured values of the input parameter or of the input parameters, whereby the connection between the setpoint value of the process variable and the value or values of the input parameters has been designated beforehand one time. This predetermined connection (predetermined combination or mathematical mapping between values of the input parameters and values of the process variables) is optimised with respect to an improved energy yield of the system (system efficiency). A complex process for solving model equations is not necessary during the operation of the thermal cyclic process, which is advantageous. With the determined setpoint value of the process variable, the thermal cyclic process is then controlled in such a manner that a value of the process variable strives towards the setpoint value. For example, this can come about by means of setting the rotational speeds of the feeding pump, expansion machine, and condenser fan according to predetermined values so that the setpoint value of the process variable or of these process variables can be achieved quickly and reliably.

In the case of a change in the values of the input parameters, it is possible to react quickly by carrying out the steps to determine the setpoint value and the subsequent control again.

A further development of the method according to the invention consists in that the determination of the setpoint value of the process variable of the thermal cyclic process can comprise a calculation of the setpoint value from a predetermined function, particularly from a polynomial function, into which the input parameters enter as variables.

Another further development consists in that a designation of the function for calculating the setpoint value of the process variable can be carried out by means of carrying out trials and/or from model equations as a further step before the step (a).

Another further development consists in that the designation of the function for calculating the setpoint value of the process variable can comprise a maximisation of the product of an efficiency of the heat transfer from the heat source to the cyclic process and an efficiency of the cyclic process.

Another further development of the method according to the invention consists in that the determination of the setpoint value of the process variable of the thermal cyclic process can take place by means of reading out the setpoint value from a predetermined table depending on a value of an input parameter or respective values of a plurality of input parameters of the thermal cyclic process, whereby, where applicable, it is possible to interpolate between the table values.

Another further development consists in that a designation of the table for calculating the setpoint value of the process variable can be carried out by means of carrying out trials and/or from model equations as a further step before step (a).

Another further development consists in that the designation of the table for calculating the setpoint value of the process variable can comprise a maximisation of the product of an efficiency of the heat transfer from the heat source to the cyclic process and an efficiency of the cyclic process.

Another further development consists in that at least one further process variable is controlled in accordance with the method according to the invention.

Another further development consists in that the process variable or the process variables can be the vaporisation temperature or the vaporisation pressure of the working medium and/or the condensation temperature or the condensation pressure in a condenser of the thermal cyclic process and/or the vapour temperature or the vapour pressure at the outlet of an expansion machine of the thermal cyclic process.

Another further development consists in that the input parameter or the input parameters can comprise a mass flow of a gas from the heat source or a quantity representative for this mass flow and/or a temperature of the exhaust gas and/or a temperature of the outside air and/or a condensation temperature of the working medium of the cyclic process.

Another further development consists in that the control of the thermal cyclic process can be carried out by means of model predictive control (MPC).

Another further development consists in that the control of the thermal cyclic process can take place by means of setting a rotational speed of a feeding pump and/or of an expansion machine and/or of a condenser fan.

Another further development consists in that the control can comprise a repeated or a continuous comparison of an actual value with the setpoint value of the process variable.

The abovementioned object of the invention is furthermore solved by a device for controlling a thermal cyclic process, in particular an ORC, which comprises a microprocessor for carrying out the method according to the invention or according to one of its further developments and a thermal cyclic process, particularly an ORC, with one or more heat exchangers for transferring heat from one or more heat sources to a working medium of the thermal cyclic process.

The abovementioned object of the invention is likewise solved by a computer program product, comprising at least one computer-readable medium with instructions that can be executed by a computer and that are for carrying out the steps of the method according to the invention or according to one of its further developments during operation of a computer.

The different further developments can be used independently of one another or combined with one another.

Further preferred embodiments of the invention are described in the following with reference to the drawings.

BRIEF DESCRIPTION OF THE DRAWINGS

FIG. 1 shows an ORC system schematically.

DETAILED DESCRIPTION OF THE INVENTION

FIG. 1 shows, in a schematic manner, a system which contains an Organic Rankine Cycle 100.

A pump/feeding pump 10 brings the fluid working material to operating pressure. When the fluid working medium flows through a vaporiser 20, heat from a heat source 30 is fed to the working medium. Due to the application of energy, the working medium is pre-heated and partially or fully vaporised and, where applicable, superheated. As a rule, saturated vapour or wet vapour or superheated vapour forms at the outlet of the vaporiser 20. The vapour of the working medium flows out of the vaporiser 20 via a pressure pipe to the expansion machine 40, where it is expanded to a lower pressure, as a result of which work is performed which is converted into mechanical energy by the expansion machine 40 and then, for example, by means of a generator coupled to it, further converted into electrical energy, or used in another form. e.g., by the direct drive of mechanical consumers or of the drive of a hydraulic pump. The vapour then flows through a condenser 50, where the vapour gives off the sensible heat and the condensation heat to a cooling cycle with a cooling medium flow. The working medium condenses and changes over completely into the liquid state of matter. The saturated fluid or supercooled working medium is stored temporarily in the storage container 60. The pump 10 then brings the saturated working medium from the storage container 60 back to operating pressure, and consequently closes the cycle.

Approach of the Invention

The object of the invention is a concept for controlling the Organic Rankine Cycle 100 or also another cyclic process in conjunction with a highly dynamic waste heat source 30. Very generally understood as a dynamic waste heat source is a heat source whose heat output fluctuates over time due to a change in the mass flow holding the heat and/or in the temperature and/or in the thermal capacity. For example, particularly called dynamic or highly dynamic are those heat sources in which a heat output H1 at a time t1 can change by more than 25%, more than 50% or even more than 75% of the heat output H1 to a heat output H2 at a time t2, whereby the time difference t2−t1 can be less than one hour, less than ten minutes, less than one minute, less than one second or less than 0.1 second.

The ORC system consists of different components that have a different influence on the efficiency. The components consequently have a different, usually non-linear development of the efficiency in a case of a partial load, and several correcting values have contrary influences on the efficiency. Cited here as an example is the condenser 50. If the condenser 50 is better cooled due to a higher airflow rate, the efficiency of the cyclic process increases, i.e., it Is possible to convert more energy ($P_{el,\ gross}$). In contrast, however, there is a rise in the auxiliary power ($P_{el,\ auxiliary\ power}$), which includes the energy to be expended for the fan. A further extremely important component is the heat exchanger/vaporiser 20, in which the waste heat is transferred to the ORC working medium. Due to the controlling interventions in the feeding pump/pump 10 and the expansion machine 40, the heat output $\dot{Q}_{TransferredHeat}$ transferred to the ORC 100 from the waste heat source 30 by the heat exchanger 20 changes significantly.

The control concept according to the invention makes it possible to drive the ORC 100 in the optimal operating point, whereby the optimisation criterion is the so-called system efficiency $\eta_{System}$, which is made up of the efficiency of the heat transfer $\eta_{HT}$ and the cycle efficiency $\eta_{th,\,net}$ of the ORC 100. These two partial efficiencies are not independent of each other. Consequently an increase in the cycle efficiency can worsen the heat transfer efficiency to the point that the product of the two efficiencies $$\eta_{System} = \eta_{HT} \cdot \eta_{th,net} = \eta_{HT} \cdot \frac{P_{el,gross} - P_{el,AuxiliaryPower}}{Q_{TransferredHeat}}$$

is nevertheless reduced.

According to the invention, the control of a thermal cyclic process, in particular of an ORC with model-based control, is carried out in such a way that operation optimised with respect to the system efficiency occurs. One of the problem areas that is solved according to the invention is that an online optimisation calculation cannot be represented with sufficient speed because this calculation would have to take into account a multitude of parameters.

Available as input quantities are the mass flow of the exhaust gas from the heat source (or other quantities that allow the mass flow to be designated, such as, e.g., a rotational speed of a combustion engine) and its temperature, as well as the temperature of the outside air. The rotational speed of the feeding pump, the rotational speed of the fan motor of the condenser and the rotational speed of the expansion machine can be changed, whereby the effects of changes are complex to some extent (e.g., heat transfers, change in the pressure situation at which the vaporisation takes place, changeable areas for pre-heating and vaporisation) and can frequently be calculated only iteratively.

According to the invention, the controller should not carry out an optimisation for a given load point during ORC operation, and instead should already "know", based on stored data, at which rotational speeds the individual assemblies should run in order to obtain the maximum energy yield with the current parameters of the heat source. The approach is now such that the system is mapped in a simulation environment whereby the actual behaviour of the components in the event of a load change is mapped. The behaviour of the components can be derived from trials or it can also be known from the literature (model equation, correlations).

For example, now the optimal vaporisation temperature can be calculated in dependence on the mass flow and temperature of the heat source as well as on the condensation temperature. Now a smoothing function (e.g., a polynomial) is defined for the optimal vaporisation temperatures that have been found, whereby this smoothing function makes it possible to determine the vaporisation temperature directly and without the model equations for the individual components from the parameters of the heat flow and the parameters of the condensation. The vaporisation temperature calculated in this way can now be used as a correcting value for the MPC.

In the first step, the control concept, working with a pre-determined combination or mathematical mapping between values of the input parameters and values of the process variables, consequently calculates which values of the process variable or of the process variables (setpoint values) allow optimised operation and then adjusts the rotational speeds of the feeding pump, expansion machine and condenser fan such that these process variables are achieved quickly and reliably. By means of a continuous comparison of the setpoint values and the actual state, the reaction here is also quick, whereby the future actual state is also taken into consideration in the control. The average relative system efficiency is up to 10% greater than in the case of conventional control with fixed vaporisation temperatures.

In summary, it can be recorded that while model predictive control with fixed setpoint values (e.g., fixed-pressure control) according to the state of the art allows fast control, no optimisation of the operating point takes place in this control. In addition, online optimisations are very computation-intensive and too slow for highly transient processes. In contrast, the invention's designation of the optimal process variables ahead of time and the determination of a function for calculating the process variables depending on the input parameters are fast and economical. A combination of these two concepts allows simple, economical control that is optimised with respect to the system efficiency and that allows, without additional costs, an energy yield that is approximately 10% greater than that of conventional concepts.

The invention claimed is:

1. A method for controlling a thermal Organic Rankine Cycle (ORC) process, which is operated with a working medium in conjunction with a dynamic heat source, comprising:
    (a) determination of a setpoint value of a process variable of the thermal cyclic process from a value of an input parameter or respective values of a plurality of input parameters of the thermal cyclic process;
    (b) control of the thermal cyclic process with the determined setpoint value of the process variable as a target variable of the control; and
    (c) repeated execution of steps (a) and (b) when at least one value of the input parameters changes,
    wherein the determination of the setpoint value of the process variable of the thermal cyclic process comprises a calculation of the setpoint value from a pre-determined function into which the input parameters are input as variables.

2. The method according to claim 1 wherein the determination of the setpoint value of the process variable of the thermal cyclic process comprises the calculation of the setpoint value from a polynomial function.

3. The method according to claim 2 with, carried out before the step (a), the additional step:
    designation of the function for calculating the setpoint value of the process variable by means of carrying out trials and/or from model equations.

4. The method according to claim 3 wherein the designation of the function for calculating the setpoint value of the process variable comprises a maximisation of the product of an efficiency of the heat transfer from the heat source to the cyclic process and an efficiency of the cyclic process.

5. The method according to claim 1 wherein at least one further process variable is controlled in a corresponding manner.

6. The method according to claim 1 wherein the process variable is or the process variables are the vaporisation temperature or the vaporisation pressure of the working medium and/or the condensation temperature or the condensation pressure in a condenser of the thermal cyclic process and/or the vapour temperature or the vapour pressure at the outlet of an expansion machine of the thermal cyclic process.

7. The method according to claim 1 wherein the input parameter comprises or the input parameters comprise a mass flow of a gas from the heat source or a quantity that is representative for this mass flow and/or a temperature of the exhaust gas and/or a temperature of the outside air and/or a condensation temperature of the working medium of the cyclic process.

8. The method according to claim 1 wherein the control of the thermal cyclic process is carried out by means of model predictive control (MPC).

9. The method according to claim 1 wherein the control of the thermal cyclic process takes place by means of setting a rotational speed of a feeding pump and/or of an expansion machine and/or of a condenser fan.

10. The method according to claim 1 wherein the control comprises a repeated or continuous comparison of an actual value with the setpoint value of the process variable.

11. A device comprising:
a thermal Organic Rankine Cycle (ORC) process with one or more heat exchangers for transferring heat from one or more heat sources to a working medium of the thermal cyclic process; and a microprocessor for carrying out the method according to claim 1 for controlling the thermal cyclic process.

12. A computer program product comprising at least one non-transitory computer-readable medium with instructions that can be executed by a computer and that are for carrying out a method for controlling an Organic Rankine Cycle (ORC) process during operation on a computer, the instructions when executed by the computer cause the computer to:
(a) determine a setpoint value of a process variable of the thermal cyclic process from a value of an input parameter or respective values of a plurality of input parameters of the thermal cyclic process;
(b) control of the thermal cyclic process with the determined setpoint value of the process variable as a target variable of the control; and
(c) repeat execution of steps (a) and (b) when at least one value of the input parameters changes,
wherein the determination of the setpoint value of the process variable of the thermal cyclic process comprises a calculation of the setpoint value from a predetermined function into which the input parameters are input as variables.

* * * * *